March 17, 1936. H. L. PLATT 2,034,535
EDUCATIONAL AND RECREATIONAL APPARATUS
Filed Jan. 24, 1935 2 Sheets-Sheet 1
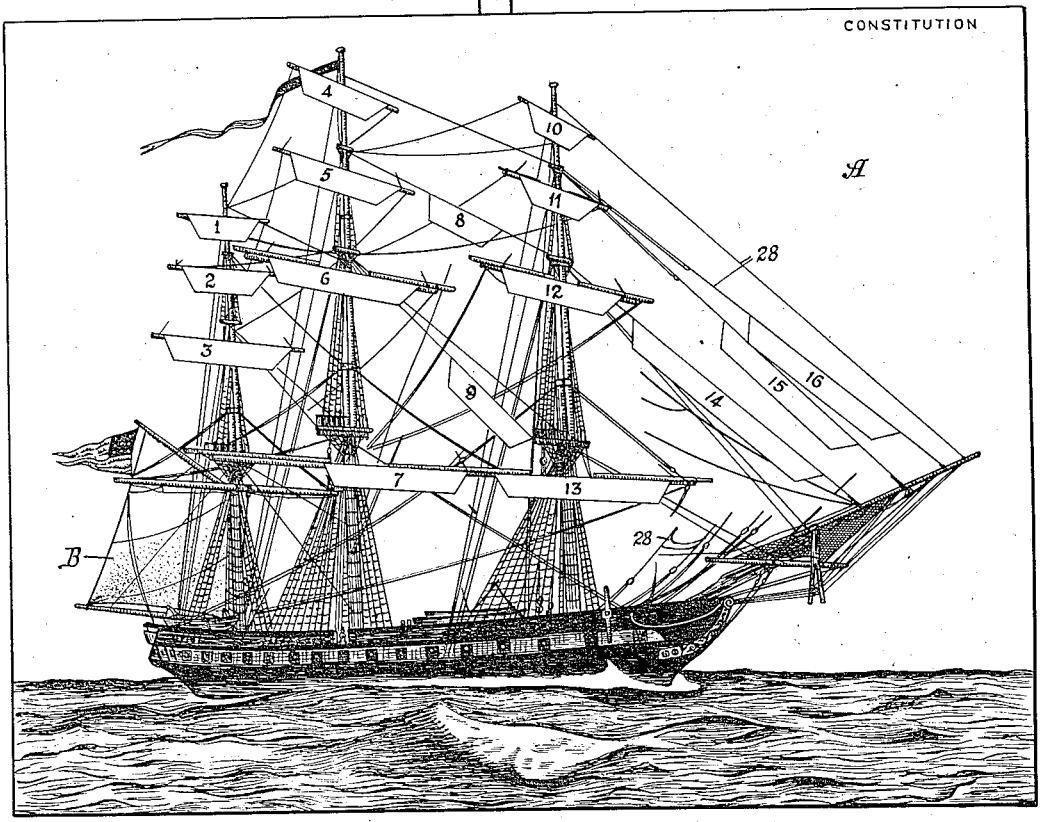
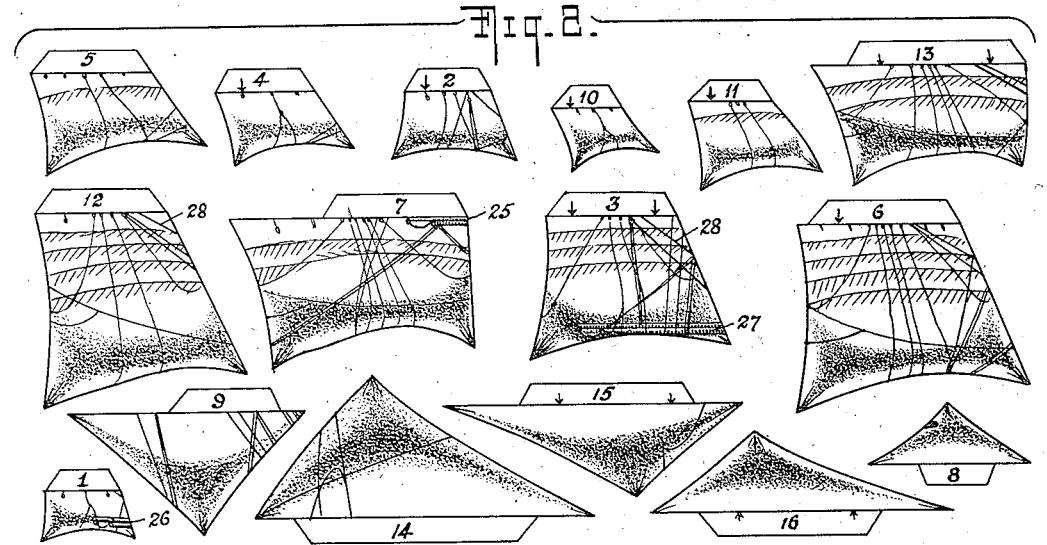
WITNESS
INVENTOR
HAROLD L. PLATT
BY
ATTORNEYS March 17, 1936.  H. L. PLATT  2,034,535
EDUCATIONAL AND RECREATIONAL APPARATUS
Filed Jan. 24, 1935  2 Sheets-Sheet 2
Fig. 3.
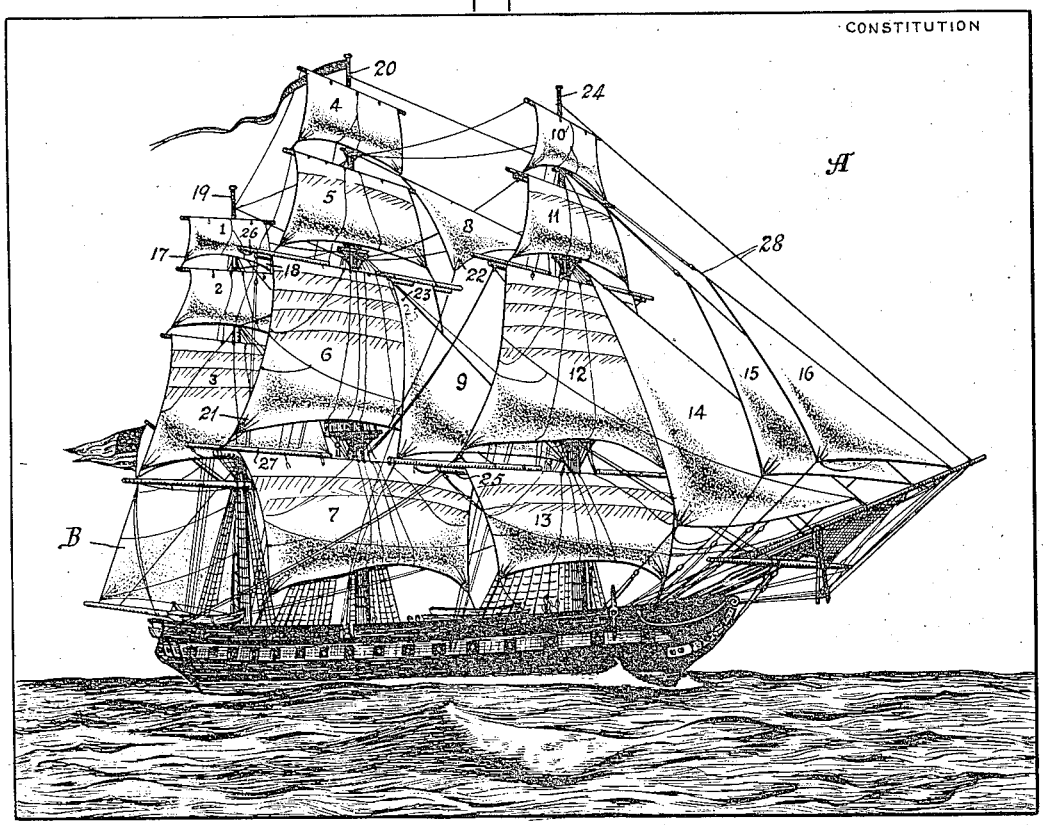
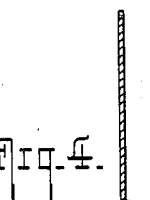
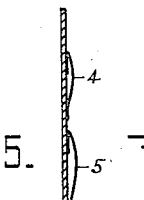
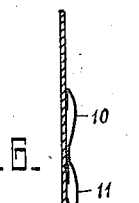
WITNESS
INVENTOR
HAROLD L. PLATT
BY
ATTORNEYS Patented Mar. 17, 1936

2,034,535

UNITED STATES PATENT OFFICE 2,034,535

EDUCATIONAL AND RECREATIONAL APPARATUS

Harold L. Platt, Cranston, R. I.

Application January 24, 1935, Serial No. 3,256

1 Claim. (Cl. 35—26)

The present invention relates to apparatus suitable for educational and recreational purposes and relates in general to the building up of a three-dimensional object or scene by the proper positioning and mounting of structural parts upon a planar or two-dimensional representation of the object or of a skeleton of the object or scene.

My invention relates generally to apparatus suitable for use in schools and at home for instructional and also recreational purposes wherewith the pupil or operator can gradually build up a three-dimensional object, such as a ship, an airplane, a theatrical or motion picture set, a circus, a scenic view, etc., piece by piece, and wherein instruction of any desired kind may be combined with the natural joy of creation, and familiarity with the construction and function of the various parts of the object or scene being assembled thereby obtained.

Although the invention is capable of application on many and divers constructional assemblies, I shall further describe the same in detail in connection with the mounting of the sails and also, if desired, the other rigging upon a picture, that is, a two-dimensional representation, of a skeleton of a multi-masted frigate. The numerous sails upon a ship of this kind, their shape, arrangement and mode of functioning, are extremely confusing to one unfamiliar with the construction and operation of the sails and rigging of a sail boat. Recognizing the fact that a pupil remembers longest that instruction which was accompanied by visual representations, particularly when accompanied by manual application, I have devised an apparatus wherewith the pupil is required to mount each of the sails, together with their yards, upon the masts of the ship, in proper sequence and in proper relation to the other parts of the ship. The parts may be so arranged and marked that the sails must be mounted upon a skeleton representation of the ship in a definite order, for example, the order in which the sails are set or spread. The sails and the corresponding parts of the ship to which they are attached can be marked with varying degrees of detail so as to make it more or less difficult for the pupil to mount the sails properly. Thus, for beginners, the sails can be given a numbering or lettering corresponding with the parts to which they are attached, whereas for advanced students, the sails may have no indicia of any kind thereon or they may have certain representations of rope or other rigging thereon to aid the pupil in some measure in properly orienting the sail upon its mast.

Where the skeleton representation of the ship is done artistically and the separate sails are cut and mounted neatly and properly bellied, there may be obtained a sail ship with full set sails which are arched away from the plane of the hull and masts of the ship, giving a very pleasing effect of a three-dimensional replica of a sail boat running in high wind which is suitable for framing. Such replica is three-dimensional only in part and is in effect in low relief, where relief is present, and perspective is combined in the yards of the ship to give the appearance of the third dimension namely, width.

The parts of my apparatus may comprise a skeleton view of a ship, such as a frigate, schooner, brig, sloop, "Santa Maria", yacht, whaler, etc., upon a cardboard or other suitable surface, colored or not, as desired, and a set of separate sails which may either be pre-cut and trimmed and require only mounting, or else printed upon a relatively stiff paper to be cut out by the pupil or operator. The paper of which the sails are composed and the shaping of the sails are preferably such that the sails can be bowed or bellied as they are mounted upon the ship to give the effect of a ship with full set sails. The sails may have suitable tabs thereon which are to be attached, as by gluing or stapling, to suitable parts of the surface upon which the skeleton of the ship is represented; and the sails may also show the yards and the various pulleys and cables associated with the sails or visible from in front of the sails. The tabs or other parts of the sail may bear suitable characters or letters corresponding to characters and letters upon the picture of the ship; or the showing of the rigging upon the sails may be so drawn that the operator is assisted in properly orienting the sails upon the ship by bringing the rigging parts into registry with each other.

The invention will be further described with the aid of the accompanying drawings which illustrate the invention as embodied in an apparatus for mounting and assembling the numerous sails upon a three-masted frigate. In said drawings, Fig. 1 is a view showing the hull and also the skeleton framework of the three-masted frigate "Constitution";

Fig. 2 shows the various sails which are to be mounted upon the masts of the ship;

Fig. 3 is a view similar to Fig. 1 but showing the sails properly mounted upon the representation of the ship and giving the effect of a three-dimensional assembly, and Figs. 4, 5 and 6 are sectional views taken through the mizzenmast, mainmast and foremast, respectively.

My improved educational and recreational apparatus comprises first of all a skeleton representation or picture A of a sailing vessel, showing the hull, masts and parts of the rigging of a three-masted frigate, such as the historic "Constitution". For economy of manufacture, this reproduction is entirely two-dimensional and represents a print upon a suitably stiff cardboard or other surface. This two-dimensional representation may include the end or spanker sail B.

The other sails of the frigate are illustrated in Fig. 2. These sails may be furnished to the pupil or operator ready-cut and trimmed, or they may be printed upon paper to be cut out by him. It is the task of the pupil or operator to mount the sails shown in Fig. 2 upon the picture shown in Fig. 1, not only in their proper position but in such order that the proper positioning of one sail will not be prevented by the premature mounting of another sail. It will be assumed that the apparatus is designed for use by beginners who have had no previous instruction in the shape or position of the various sails of a sailing vessel. The sails are accordingly numbered in a manner to correspond with their position and also, if desired, with the order of their mounting. The sails shown in Fig. 2 are each provided with a tab, the sails being identified by the numeral upon the tab. This tab is designed to be bent down in the manner shown at C in Figs. 4, 5 and 6 and attached, by means of paste, glue or by stapling or in any other manner, to correspondingly identified areas upon the picture A. Thus the tab of the mizzenroyal sail 1 is designed to be bent rearwardly of the plane of the drawings and to be coated with paste upon the surface visible in the drawings; this tab is then placed over the area 1 in Fig. 1 and in a similar manner the tabs attached to the other sails are pasted to the correspondingly identified areas shown in Fig. 1.

The sails may be mounted upon the two-dimensional representation A of the ship in the following manner: The mizzen royal mast 1 is first mounted by means of its tab along the upper edge thereof, as already described, and it is then pasted at its lower edges 17 and 18 in such a manner that the sail is arched or bellied away from the surface of the picture. The mizzen topgallant sail 2 and the mizzen topsail 3 are then mounted in the same fashion. This completes the assembly of sails on the mizzenmast.

The main royal sail 4, the main topgallant sail 5, the main topsail 6 and the mainsail 7 are then mounted upon the mainmast 20 in a manner similar to the mounting of the mizzenmast sail except that the lower left hand corner of the main topsail 6 is pasted upon the mizzen topsail 3 as shown at 21. The triangular main topgallant staysail 8 and the main top mast staysail 9 are now mounted in the order indicated, the lower corner 22 of the sail 8 being pasted upon the picture as shown at 22 while the upper corner 23 of the sail 9 is pasted to the main topsail 6.

The foreroyal sail 10, the fore topgallant sail 11, the fore topsail 12 and the foresail 13 are now mounted upon the foremast 24, the lower left hand edge of the sail 12 being pasted upon the main topmast staysail 9. The fore topmast staysail 14, the inner jib 15 and the outer jib 16 are now mounted in the order named, the lower corner of the inner jib being pasted upon the staysail 14 and the lower corner of the outer jib 16 being pasted upon the inner jib 15.

It will be understood that in the mounting of the various sails care will be taken to give the same a sufficient degree of arching to convey the impression of a vessel under full sail.

The sails may have thereon, in whole or in part, a view of the associated or adjacent yards 25, 26, 27, etc. and of the various parts of the rigging or securing lines 28 of the vessel. The skeleton representation of the vessel in Fig. 1 likewise includes a showing of the various yards and rigging or securing lines of the ship. The proper positioning of the sails can be assured by causing the showing of the yard and rigging on the sails and on the picture shown in Fig. 1 to register with each other.

From the above it will be seen that I have provided an apparatus with the aid of which pupils can be taught the names, constructions, arrangements, functions, etc. of the various parts of more or less complicated objects, assemblies, etc. while at the same time a considerable degree of interest and amusement can be aroused in the pupil. It will be evident that the invention is applicable also to apparatus whose main purpose is recreational, while, as in the case of a sailing vessel, a three-dimensional effect is obtained which can have considerable artistic value and can be utilized as a decoration or for other purposes.

I claim:

An educational and recreational device comprising a backing, a representation of the hull and masts and parts of yards and securing lines of a vessel printed on said backing, a multiplicity of sails fashioned to complete the representation of the vessel under sailing conditions, some of the said sails having printed thereon portions of the yards and a plurality of securing lines, omitted from the said backing, said portions of the yards and securing lines printed on said sails indicating the proper position of the sails and constituting guide lines to align said sails with respect to the representation of the vessel and with respect to adjoining sails.

HAROLD L. PLATT.